United States Patent [19]

Conti-Ramsden et al.

[11] Patent Number: 4,942,203
[45] Date of Patent: Jul. 17, 1990

[54] POLYMER COMPOSITIONS

[75] Inventors: John N. Conti-Ramsden, Wellesley, Mass.; Robert A. Head, Upton; Richard L. Powell, Tarporley; Brian D. Young, Winsford, all of England

[73] Assignee: Imperial Chemical Industries PlC, London, England

[21] Appl. No.: 217,226

[22] Filed: Jul. 11, 1988

[30] Foreign Application Priority Data

Jul. 9, 1987 [GB] United Kingdom ................. 8716198

[51] Int. Cl.$^5$ ...................... C08L 71/00; C08L 27/12; C08F 232/02
[52] U.S. Cl. .................................. 525/185; 525/186; 525/199; 525/200; 525/412; 528/392
[58] Field of Search ............... 525/185, 199, 200, 412, 525/186; 528/392

[56] References Cited

U.S. PATENT DOCUMENTS

| | | | |
|---|---|---|---|
| 3,627,839 | 12/1971 | Vandenberg | 528/392 |
| 4,361,678 | 11/1982 | Tatemoto et al. | 528/392 |
| 4,529,785 | 7/1985 | Ohmori et al. | 526/247 |
| 4,544,720 | 10/1985 | Ohmori et al. | 526/247 |
| 4,581,412 | 4/1986 | Ohmori et al. | 525/199 |
| 4,667,000 | 5/1987 | Ohmori et al. | 526/247 |

Primary Examiner—John C. Bleutge
Assistant Examiner—Susan Berman
Attorney, Agent, or Firm—Cushman, Darby & Cushman

[57] ABSTRACT

A polymer composition comprising (1) a polyether polyol which is a product obtained by the free radical addition of a fluoro-olefin of the general formula:

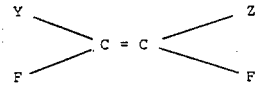

wherein Y represents F or fluoroalkyl and Z represents Cl or F(CF$_2$)m—
wherein m is an integer from 0 to 10 or Y and Z together form a (CH$_2$)p—chain wherein p represents an integer from 2 to 4, to a polytetramethylene gylcol having a molecular weight in the range 162 to 5000 and (2) at least one acrylic polymer. The composition is useful for coating compositions or for the fabrication of films.

7 Claims, No Drawings

POLYMER COMPOSITIONS

The present invention relates to polymer compositions comprising certain fluorine-containing polymers and acrylic polymers.

It is known to employ various fluorine-containing homo- or copolymers as the basis for the provision of high quality products, such as coating films or paints, free-standing films, and moulded or sintered articles, since they possess properties such as excellent durability, weatherability, chemical and thermal resistance, stain resistance, and appearance. Such fluorine-containing polymers may optionally have incorporated therein functional monomeric units for imparting cross-linkability in order to achieve further advantages or further improved properties. These fluorine-containing polymers are, however, expensive materials. Moreover, products formed therefrom tend to be opaque.

It has been proposed to use certain of these fluorine-containing polymers in combination with acrylic polymers, typically poly(methyl methacrylate), in order to overcome disadvantages such as lack of transparency. This also has the attraction of providing a cheaper material, acrylic polymers being much less expensive than fluorine-containing polymers. However, most fluorine containing polymers have been found to be poorly compatible with acrylic polymers. Complete compatibility in this context is taken to mean the situation where there is intimate mixing of the fluoro- and acrylic polymers at the molecular level, and is commonly assessed by differential scanning calorimetry (DSC) or thermo-mechanical analysis. Techniques for such assessment are described in "The Mechanical Properties of Polymers" by L E Nielsen, Reinhold Publishing Corporation, 1962, page 172 et seq. For example, copolymers comprising fluorolefin, cyclohexyl vinyl ether and other comonomers described in Japanese Publication No. 57-34107 for use in high quality coating (e.g. paint) compositions which are curable at ambient temperature cannot be compatibly blended with acrylic polymers to provide products of good transparency. Indeed, the only fluorine-containing polymers hitherto described in the literature as being compatible with acrylic polymers are certain vinylidene fluoride copolymers as described e.g. in European Patent Publications 0135917A and 0190654A) and certain copolymers comprising chlorotrifluoroethylene and 2,2,3,3-tetrafluoropropyl vinyl ether (as described in European Patent Publications 0121934A). The choice of fluorine-containing polymers which are compatible with acrylic polymers for use in compositions has thus been very restricted.

It has now been found that certain fluorine-containing polymers as hereinafter defined are surprisingly compatible with acrylic polymers, the compatibility generally being good and in some cases being complete. Thus, useful stable polymer compositions containing both fluoropolymers and acrylic polymers can be prepared without difficulty.

Thus, according to the invention, there is provided a polymer composition comprising at least one polymer having functional end groups and pendent fluorine-containing groups and at least one acrylic polymer.

The functional end groups present in the fluorine-containing polymer are groups which are capable of acting as cross-linking sites, that is to say groups which are reactive towards cross-linking agents. Examples of such groups include hydroxy, primary and secondary amino, carboxy, epoxy and siloxane groups.

The pendent fluorine-containing groups present in the fluorine-containing polymer may be, for example, fluoroalkyl, fluoroalkoxy, fluoroalkoxyalkyl or fluorocycloalkyl groups wherein said groups may be partially or completely fluorinated. The partially fluorinated groups may optionally contain other halogen atoms such as chlorine.

Suitable fluoroalkyl groups include $CF_3—$, $CF_3CF_2—$, $(CF_3)_2CF—$ and particularly groups of the formulae:

$HCR^1R^2CF_2—$ or $CHF_2CR^1R^2—$ and mixtures thereof wherein $R^1$ is halogen or fluoroalkyl and $R^2$ is hydrogen or halogen. Examples of such groups include $HCF_2CF_2—$, $HCClFCF_2—$, $HCCl_2CF_2—$, $CF_3CHFCF_3—$, $CHF_2CF(CF_3)—$ and $CH_2FCF_2—$. Other suitable fluoroalkyl groups have the formula:

$$H(CFR^3CF_2)_n$$

wherein $R^3$ is Cl or F and n is 1, 2 or 3. Groups of this type include $H(CF_2CF_2)_n—$ and $H(CClFCF_2)_n—$. Other useful fluoroalkyl groups include $CF_3CF_2CH_2—$, $CF_3CH_2—$, $(CF_3)_2CFCH_2—$ and $(CF_3)_2CHC(CF_3)_2—$.

Suitable fluoroalkoxy groups include groups of the formula:

$$HCR^4R^5CF_2CH_2O—$$

wherein $R^4$ is Cl or F and $R^5$ is halogen or fluoroalkyl. Examples of such groups include $HCF_2CF_2CH_2O—$, $CF_3CHFCF_2CH_2O—$, $HCClFCF_2CH_2O—$ and $HCCl_2CF_2CH_2O—$.

Suitable fluoroalkoxyalkyl groups include $CF_3OCH_2—$, $CF_3CF_2OCH_2—$, $(CF_3)_2CFOCH_2—$ and groups of the formula:
$$HCR^6R^7CF_2OCH_2—$$

wherein $R^6$ is Cl or F and $R^7$ is halogen or fluoroalkyl. Examples of such groups include $HCF_2CF_2OCH_2—$, $CF_3CHFCF_2OCH_2—$, $HCClFCF_2OCH_2—$ ad $HCCl_2CF_2OCH_2—$.

Examples of preferred fluorine-containing groups include $CF_3CHFCF_2—$, $H(CF_2CF_2)_n—$ where n is 1, 2 or 3, $CHClFCF_2—$, $CHCl_2CF_2—$, $HCF_2CF_2CH_2OCH_2—$, $CHClFCF_2OCH_2—$, $CHCl_2CF_2OCH_2—$ and $CF_3CHFCF_2OCH_2—$.

The polymer having functional end groups and pendent fluorine-containing groups is preferably a polyether, especially a polyether polyol.

One particularly useful class of polymer may be obtained by the free radical addition of a fluoro-olefin of the general formula:

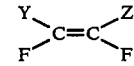

wherein Y represents F or fluoroalkyl and Z represents Cl or $F(CF_2)_m—$ wherein m is an integer from 0 to 10 or Y and Z together form a $(CF_2)_p—$ chain wherein p represents an integer from 2 to 4, to a polytetramethylene glycol (polytetrahydrofuran) having a molecular weight in the range 162 to 5000, especially 250 to 3000.

Fluoro-olefins which may be used in the preparation of the fluorine-containing polyether polyols include tetrafluoroethene, chlorotrifluoroethene, hexafluoropropene, perfluorinated nonene-1, hexafluorocyclobutene, octafluorocyclopentene and decafluorocyclohexene.

The free radical addition of the fluoro-olefin to the polyether is performed under conditions in which free radicals are generated. Such conditions have been fully described in the prior art and include the use of known free radical generators, for example azo compounds and the peroxy compounds such as the peroxides, persulphates, percarbonates and perborates as well as ultraviolet and gamma radiation. Di-t-butyl peroxide has been found to be particularly effective.

The free radical addition may be carried out at temperatures up to 200° C. Solvents are not usually necessary when the polyether is a liquid at the reaction temperature but inert solvents may be used when required. Separation of the reaction product from any remaining starting materials and any solvent used may be effected using conventional techniques.

The fluorine content of the fluorine-containing polyethers may be varied by varying the constitution and/or amount of the fluoro-olefin and/or by varying the free radical addition conditions. In general, the fluorine containing polyethers should have a fluorine content in the range from 5 to 60% on a weight basis, although the possibility of using polyols having lower or higher fluorine contents is not excluded. Preferred fluorine-containing polyethers contain from 20 to 50%, especially from 25 to 45%. of fluorine on a weight basis.

The fluorine-containing polymers obtained by the addition of fluoro-olefins to polytetramethylene glycol are believed to be diols containing, among others, repeat units of the formula:

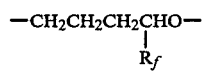

and possibly

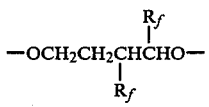

wherein $R_f$ represents a group of the formula:

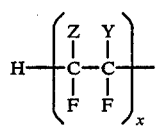

or

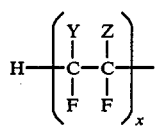

wherein Y and Z are as defined above and x is a positive integer. The products may also contain some repeat units having more than one $R_f$ group and/or no $R_f$ groups.

Analogous polyether polyols having pendent fluoroalkyl groups may be prepared by the free radical addition of the fluoro-olefins to other polyether polyols, for example polyoxyethylene, polyoxypropylene and polyoxytrimethylene polyols and various block and random copolymers that can be prepared by the polymerisation of two or more of ethylene oxide, propylene oxide, oxacyclobutane and tetrahydrofuran. When starting from these polyethers, however, it is preferable to protect the hydroxyl groups, for example by acetylation, before grafting on the fluoro-olefin and then to remove the protecting groups subsequently.

Other polymers having functional end groups and pendent fluorine-containing groups which may be used in the polymer compositions of the invention include polyether polyols containing repeat units of the formula:

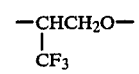

Such polyethers may be obtained by the polymerisation of 3,3,3-trifluoro-1,2-epoxypropane either alone or with other alkylene oxides. In addition to this and other fluoroalkyl substituted alkylene oxides, other alkylene oxides which may be polymerised to form polyether polyols having pendent fluorine-containing groups include fluoroalkoxy and fluoroalkoxyalkyl substituted alkylene oxides.

The cross-linkable end groups may be modified to obtain improved reactivity in curing reactions. For example, alcohol end groups may be ethoxylated.

Examples of acrylic polymers which may be present in the compositions of the invention include, for example, homopolymers and copolymers of alkyl acrylates and methacrylates containing $C_1$–$C_{20}$ alkyl groups and cycloalkyl acrylates and methacrylates. As examples of suitable monomers, there may be mentioned methyl, ethyl, n-butyl and cyclohexyl acrylates and methacrylates. Any comonomers may be selected from acrylic monomers or non-acrylic monomers such as styrene.

The acrylic polymer may be cross-linkable due to the presence therein of functional groups and, when this is so, it is preferred that it is cross-linkable by the same mechanism as the fluorine-containing polymer. Thus, the acrylic polymer may be cross-linkable because of the presence therein of functional groups such as hydroxy, primary and secondary amino, carboxy, epoxy and siloxane groups. Cross-linkable acrylic polymers may be formed by the use of functional monomers, for example hydroxyethyl methacrylate, glycidyl methacrylate, acrylamide, methacrylamide, acrylic acid or methacrylic acid, either as sole monomers or preferably as comonomers with non-functional monomers.

The acrylic polymer may be prepared in conventional manner. Thus, one or more acrylic monomers, optionally with one or more other copolymerisable monomers, may be polymerised under free radical conditions using standard emulsion, suspension, solution or bulk polymerisation techniques. If desired, the acrylic monomer(s) may be polymerised in the presence of the polymer having pendent fluorine-containing groups. This is a particularly useful method when making aqueous emulsions.

The acrylic monomers should be chosen so as to provide an acrylic polymer having good to complete compatibility with the fluorine-containing polymer.

The acrylic polymer suitably has a molecular weight within the range 1000 to 300,000.

The compositions of the invention suitably contain fluoropolymer and acrylic polymer in a dry weight ratio of from 1:99 to 95:5. Preferred compositions contain 2 to 50% by weight of fluoropolymer based on the total polymer weight.

The compositions may contain a curing agent to react with the functional groups present in the fluorine-containing polymer and optionally present in the acrylic polymer. Such agents will be selected according to the type of functional groups present. Suitable agents include polyisocyanates, polyamines, for example melamines, polyepoxides epoxy/acid compounds, epoxy/amine compounds, amino/formaldehyde compounds, siloxane compounds, glycidyl compounds, and so on.

The curing agent is suitably employed in an amount of 0.5 to 5 equivalents based on the functional groups of the polymers.

The compositions can take the form of solutions in organic solvents, in which case they can be prepared by dissolution of the fluoropolymers and acrylic polymers in a mutual solvent or by polymerisation of the acrylic monomers in a solution of the fluoropolymer. The compositions can also take the form of aqueous dispersions which can be prepared by blending of dispersions of the fluoropolymer and the acrylic polymer or by polymerisation of the acrylic monomers in a dispersion of the fluoropolymer.

The compositions of the invention may be employed for various applications (using a form of composition, e.g. solution or aqueous dispersion or powder blend etc, appropriate to the application). Examples of such applications are solvent—or aqueous based coating compositions, high solids or solventless compositions, and fabrication into articles (e.g. self-supporting films, optical fibre claddings, moulded articles etc). Particularly preferred applications are in high solids coating compositions.

The compositions of the invention may include any additives appropriate to the form of the compositions and the application(s) envisaged, e.g. pigments, dyes, curing agents (which may be added just before use, as in 2 pack systems), viscosity controllers, levelling agents, gelation aids or inhibitors, ultra-violet stabiliers, thermal stabilisers, antioxidants, anti-skin-forming agents, surfactants, and anti-foams.

Where the compositions of the invention are in the form of coating compositions, they may be applied in the same manner as any ordinary liquid coating material (e.g. paint) to the surface of a substrate such as metal, wood, plastics, ceramic, paper, glass or concrete.

The compositions of the invention provide excellent properties, including e.g. excellent chemical solvent, ultra-violet and thermal resistance, excellent stain resistance, excellent weatherability, and usually good transparency, and good film flexibility and hardness.

The invention is illustrated but not limited by the following Examples.

EXAMPLES 1-11

Component I

Polyethers having pendent hexafluoropropyl groups were prepared by the methods described in EP-A-0260846 by adding hexafluoropropene to polytetrahydrofuran. Four products were made varying in fluorine content and in the molecular weight of the polytetrahydrofuran.

Component II

IIA - Desmophen A450—EX BAYER. Hydroxyl bearing polyacrylate 50% non volatiles in ethylglycolacetate/xylene (1:1) G.P.C. Molecular weight=21797 polystyrene equivalent)

IIB—Desmophen A150—EX BAYER Hydroxyl bearing polyacrylate 60% non volatiles in xylene G.P.C. molecular weight=17507 (polystyrene equivalent)

IIC—Acrylic polyol—made by solution polymerisation of following monomers in n-butyl acetate at 70° C. nonvolatiles=33%

|  | Mole ratios | w/w ratios |
| --- | --- | --- |
| Methyl methacrylate | 1.6 | 77.2 |
| ethyl methacrylate | 0.3 | 16.5 |
| Hydroxyethyl methacrylate | 0.1 | 6.3 |

G.P.C. Mw = 26874

IID - Acrylic polyol made as in IIC but with the following monomer ratios:

|  | Mole ratios | w/w ratios |
| --- | --- | --- |
| Methyl methacrylate | 1.6 | 76.6 |
| ethyl methacrylate | 2.0 | 10.9 |
| Hydroxy ethylmethacrylate | 2.0 | 12.5 |

G.P.C. Mw = 29760
non volatiles = 36%

Components III

This is additional solvent used to assist the two polymers into solution. Methyl iso butyl ketone gas used.

Blending

Components I, II and III were blended in the ratios 1:1:1.5 w/w respectively based on the polymeric content in components I and II.

Compatibility

This was tested visually by casting each solution blend onto glass and allowing the solvent to evaporate, clear transparent films indicating compatibility. Dynamic mechanical thermal analysis measurements were made to verify the visual observations.

| Example no. | I | | | II | | III | | Visual Compatibility |
| --- | --- | --- | --- | --- | --- | --- | --- | --- |
| | P.T.H.F. Molecular weight | % Fluorine | Mass Taken (g) | Acrylic in solvent | Mass Taken (g) | Added Solvent | Mass Taken (g) | |
| 1 | 650 | 33.6 | 1 | IIA | 2.00 | MIBK | 1.5 | complete |
| 2 | 650 | 33.6 | 1 | IIB | 1.67 | " | 1.5 | " |
| 3 | 650 | 33.6 | 1 | IIC | 3.03 | " | 1.5 | " |

-continued

| Example no. | I P.T.H.F. Molecular weight | I % Fluorine | I Mass Taken (g) | II Acrylic in solvent | II Mass Taken (g) | III Added Solvent | III Mass Taken (g) | Visual Compatibility |
|---|---|---|---|---|---|---|---|---|
| 4 | 650 | 28.2 | 1 | IIA | 2.00 | " | 1.5 | " |
| 5 | 650 | 28.2 | 1 | IIB | 1.67 | " | 1.5 | good |
| 6 | 650 | 41.2 | 1 | IIA | 2.00 | " | 1.5 | good |
| 7 | 650 | 41.2 | 1 | IIC | 3.03 | " | 1.5 | complete |
| 8 | 250 | 32.0 | 1 | IIA | 2.00 | " | 1.5 | good |
| 9 | 250 | 32.0 | 1 | IIB | 1.67 | " | 1.5 | " |
| 10 | 250 | 32.0 | 1 | IIC | 3.03 | " | 1.5 | " |
| 11 | 250 | 32.0 | 1 | IID | 2.78 | " | 1.5 | complete |

EXAMPLES 12

Test Panels

Test panels of paint films from IIA and IIC with the fluorinated P.T.H.F. 650 (% fluorine=33:6) were made up as follows.

The blends were made in a 20:80 ratio w/w of components I:II based on their polymeric content.

Pigmentation with titanium dioxide was carried out to give a pigment binder ratio of 1:2.33

Component III (xylene: butanol 2:1) was added to give the desired solids content, flow and viscosity properties necessary for film forming.

Crosslinking agent=melamine formaldehyde catalyst=paratoluene sulphonic acid.

The films were cast to 100μ wet film thickness using a K-bar and bake-cured at 200° C. for 5 minutes.

Accelerated weathering on a QUV machine shows after 360 hours.

I:IIA (20:80 blend) 97.5% gloss retention.
I:IIC (20:80 blend) 98.0% gloss retention.

We claim:

1. A polymer composition comprising:
   (1) a polyether polyol which is a product obtained by the free radical addition of a fluoro-olefin of the general formula:

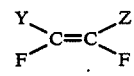

wherein Y represents F or fluoroalkyl and Z represents Cl or $F(CF_2)_m-$
wherein m is an integer from 0 to 10 or Y and Z together form a $(CF_2)_p-$ chain wherein p represents an integer from 2 to 4, to a polytetramethylene glycol having a molecular weight is the range 162 to 5000 and
   (2) at least one acrylic polymer.

2. A composition according to claim 1 wherein the polytetramethylene glycol has a molecular weight in the range 250 to 3000.

3. A composition according to claim 1 wherein the fluoro-olefin is hexafluoropropene.

4. A composition according to claim 1 wherein the polyether polyol contains from 5 to 60% of fluorine on a weight basis.

5. A composition according to claim 1 wherein the acrylic polymer is a homopolymer or copolymer of a $C_{1-20}$-alkyl acrylate or methacrylate or a cycloalkyl acrylate or methacrylate.

6. A composition according to claim 1 containing the fluorine-containing polymer and the acrylic polymer in a dry weight ratio of from 1:99 to 95:5.

7. A composition according to claim 6 containing from 10 to 50% by weight of fluorine-containing polymer based on the total polymer weight.

* * * * *